(12) United States Patent
Chou

(10) Patent No.: US 12,240,095 B1
(45) Date of Patent: Mar. 4, 2025

(54) APPARATUS FOR AN ERGONOMIC ROTATABLE GARDENING TOOL HANDLE

(71) Applicant: Hank Hung Kung Chou, Katy, TX (US)

(72) Inventor: Hank Hung Kung Chou, Katy, TX (US)

( * ) Notice: Subject to any disclaimer, the term of this patent is extended or adjusted under 35 U.S.C. 154(b) by 0 days.

(21) Appl. No.: 18/937,005

(22) Filed: Nov. 4, 2024

Related U.S. Application Data

(60) Provisional application No. 63/695,029, filed on Sep. 16, 2024.

(51) Int. Cl.
*B25G 3/00* (2006.01)
*A01B 1/22* (2006.01)
*B25G 1/10* (2006.01)

(52) U.S. Cl.
CPC ............... *B25G 1/102* (2013.01); *A01B 1/22* (2013.01)

(58) Field of Classification Search
CPC ....... B25G 1/102; B25G 1/046; A47L 13/254; A47L 13/257; A47L 13/42; A47L 13/022; A01B 1/00; A01B 1/06; A01B 1/16; A01B 1/22; A01B 15/12
See application file for complete search history.

(56) References Cited

U.S. PATENT DOCUMENTS

| | | | | |
|---|---|---|---|---|
| 7,823,256 B2 * | 11/2010 | Engelfried | ............... | B25F 5/026 16/426 |
| 8,177,272 B2 * | 5/2012 | Schinella, Jr. | ............ | E01H 5/02 294/54.5 |
| 8,782,854 B1 * | 7/2014 | Samuels | .......... | A63B 21/00043 482/126 |
| 9,507,371 B1 * | 11/2016 | Day | .......................... | G05G 1/54 |
| 9,718,181 B2 * | 8/2017 | Chou | ........................ | B25G 3/02 |
| 2006/0076203 A1 * | 4/2006 | Miller | ................... | A45C 13/262 16/113.1 |
| 2012/0133161 A1 * | 5/2012 | Mitchell | .................. | B25G 1/06 294/49 |

(Continued)

FOREIGN PATENT DOCUMENTS

| | | | | |
|---|---|---|---|---|
| CN | 211567759 U | * | 9/2020 | |
| CN | 118024189 A | * | 5/2024 | |
| DE | 102010063912 A1 | * | 6/2012 | ............. B25F 5/026 |

*Primary Examiner* — Chuck Y Mah
(74) *Attorney, Agent, or Firm* — Alexander Chen, Esq.

(57) ABSTRACT

A garden tool apparatus comprises a rod, a tool head, and a rotatable handle apparatus. The rotatable handle apparatus comprises a hand gripping apparatus that in turn comprises a lower cylindrical body that comprises threads and a hole on a side thereof. The rotatable handle apparatus further comprise a rotatable apparatus that comprises a closed cylindrical body that in turn comprises a plurality of cavities radially disposed on an outer wall thereof. The closed cylindrical body is connected to the rod. The rotatable apparatus is connected to the hollow portion. The hollow portion is freely rotatable against the rotatable apparatus. The rotatable handle apparatus further comprises a cylindrical sleeve enclosing the rotatable apparatus and is connected to both the rotatable apparatus and the hollow portion. The rotatable handle apparatus further comprises a latch apparatus that comprises an impediment pin that is disposed through the hole of the lower cylindrical body and engages with the plurality of cavities of the rotatable apparatus.

3 Claims, 5 Drawing Sheets

(56) References Cited

U.S. PATENT DOCUMENTS

| 2016/0207190 | A1* | 7/2016 | Balz | B25G 3/30 |
| 2019/0142127 | A1* | 5/2019 | Skinner | A45C 13/001 |
| | | | | 16/114.1 |
| 2022/0134533 | A1* | 5/2022 | Zorzo | A47L 13/42 |
| | | | | 15/144.1 |

* cited by examiner

APPARATUS FOR AN ERGONOMIC ROTATABLE GARDENING TOOL HANDLE

INCORPORATION BY REFERENCE

This application claims the benefit of priority to the U.S. Provisional Patent Application No. 63/695,029, filed on Sep. 16, 2024, titled "Apparatus For an Ergonomic Rotatable Gardening Tool Handle," which is incorporated herein by reference in its entirety.

FIELD OF INVENTION

The present invention relates generally to hand tool technology, and more specifically, gardening hand tool apparatuses.

PRIOR ARTS

Garden tools have been improved over the years, with a particular focus on lighter but harder materials and the ergonomics of the tools. However, challenges still need to be addressed in terms of ergonomics and the resulting usability of the tools.

Various approaches have been proposed to address these issues. For example, U.S. Pat. No. 9,718,181 discloses a rotatable gardening tool handle that rotates on the longitudinal axis of the tool shaft but is stoppable at an angular position by a pin, a pocket, and a coil spring. If the user wants to rotate the handle to another angular position, he has to apply enough torque on the handle to push the pin out of the pocket and free the handle's rotation. While this prior art reference has contributed to advancements in gardening tools, it does not work without issues. One issue is that the torque to turn the handle is sometimes accidentally applied by using the tool, for its intended uses, at a certain angle.

The present invention introduces a novel approach to address the above issue. The present invention employs a latch that operates independently of the torque of the handle. Thus, this application is an improvement on the prior U.S. Pat. No. 9,718,181.

BACKGROUND

A variety of tools improves gardening experience. A gardening hand tool is one of them. A hand tool does not need power so is ideal where a power source is impractical or burdensome. A hand tool does not need a motor either so it is slimmer and lighter, and, thus, preferred for remote worksites.

Although hand tools have advantages, they do have problems unfortunately. Hand tools can cause repetitive strain injuries (RSI) to the users due to repetitive tasks, forceful exertions, vibrations, mechanical compression, or sustained positions. RSI is an injury to the musculoskeletal and nervous systems that may affect any part of the body and at times at multiple locations, such as, but not limited to, the neck, shoulder, elbow, hand, wrist, and fingers. RSI can develop over time and can lead to long-term disability.

According to the National Institute for Occupational Safety and Health (NIOSH), excessive force imposed on muscles may increase the potential for musculoskeletal injury and disorder. Furthermore, NIOSH cites several studies that indicate that even less than excessive force may predispose a person to musculoskeletal injuries and disorders, especially during repetitive activities or static activities performed with an awkward posture.

Fortunately, several methods of reducing RSI while gardening have been developed. Some of the most common techniques include keeping elbows partially bent, especially when doing resistive activities requiring elbow strength; avoiding twisting the forearms back and forth repeatedly; keeping wrists in a neutral position; holding objects with a light grasp for a short period; and squatting with heels on the ground. While all of these actions can help minimize the occurrence of RSI, proper hand tools with a comfortable and functional design are also necessary for preventing RSI. Proper ergonomic design is necessary to prevent RSI and other musculoskeletal disorders, which can develop over time and can lead to long-term disability.

Ergonomics is the practice of designing products, systems, or processes to take property account the interaction between them and the people who use them. Ergonomics is concerned with the "fit" between the user, equipment, and their environments. The goal of ergonomics is to design a tool that creates less stress on the body. Ergonomic designs of equipment, systems, and working methods improve the comfort, health, safety, and productivity of the users.

To avoid RSI, ergonomics in gardening hand tools is needed. Incorporating ergonomic design into gardening hand tools allows gardeners to work and enjoy the gardening experience for a longer period.

One of the ergonomic designs of hand tools allows a user to set the angle that best suits them and the job they are doing. For example, the handle of a hand tool must be held at the smallest possible angle to the ground to propel motions, such as digging or lifting, forward as effectively as possible. In essence, effectively adjusting the angle between the handle and the ground allows a hand tool to exert pressure on a wider area, making the desired operations more efficient and easier to perform. Currently, many hand tools have this ergonomic rotatable handle. However, the axial forces on the handle at a certain angle turns into a torque that causes the handle to turn unwantedly. Thus, it is desirable to have a rotatable handle that only turns when the user wants.

SUMMARY OF THE INVENTION

A garden tool apparatus comprises a rod having a first end and a second end, a tool head connected to the second end of the rod, and a rotatable handle apparatus connected to the first end of the rod. The rotatable handle apparatus in turn comprises a hand gripping apparatus that in turn comprises a lower cylindrical body that further comprises threads and a hole on a side thereof. The rotatable handle apparatus further comprise a rotatable apparatus that comprises a closed cylindrical body that in turn comprises a plurality of cavities radially disposed on an outer wall thereof. The closed cylindrical body is connected to the first end of the rod. The rotatable apparatus is connected to the hollow portion. The hollow portion is freely rotatable against the rotatable apparatus on a longitudinal axis of the rotatable apparatus and the rod. The rotatable handle apparatus further comprises a cylindrical sleeve enclosing the rotatable apparatus and is connected to both the rotatable apparatus and the hollow portion. The rotatable handle apparatus further comprises a latch apparatus that is attached to a side of the hand gripping apparatus and comprises an impediment pin that is disposed through the hole of the lower cylindrical body and engages with the plurality of cavities of the rotatable apparatus.

In one embodiment of the rotatable handle apparatus, the impediment pin is rotatable.

BRIEF DESCRIPTION OF DRAWINGS

The figures which accompany the written portion of this specification illustrate the embodiments and methods of use for the present disclosure, a gardening tool handle for a variety of hand tools, constructed and operative according to the teachings of the present disclosure.

DETAILED DESCRIPTION OF THE INVENTION

Figure 1:
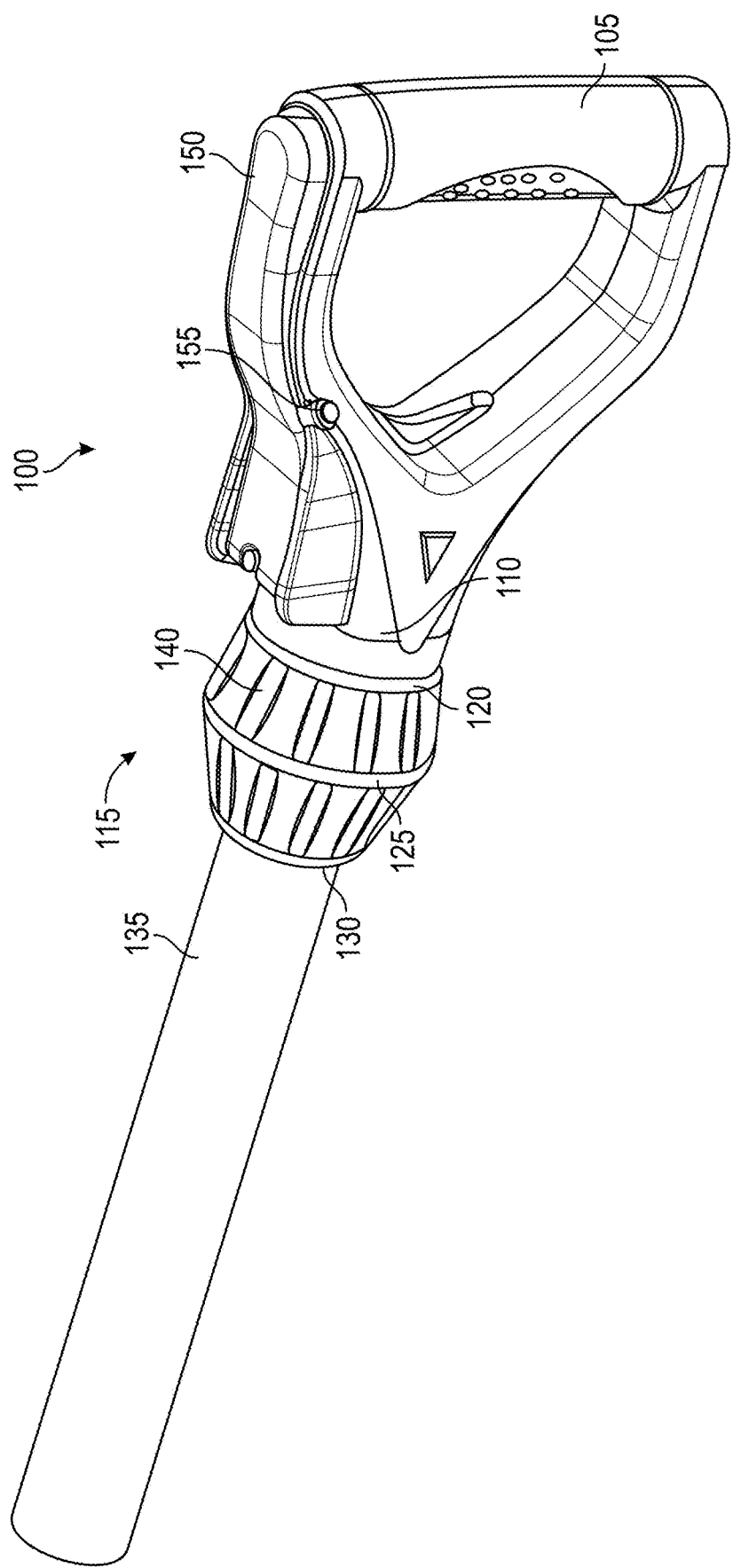
FIG. 1 depicts a perspective view of an embodiment of the current invention.

FIG. 1 illustrates a perspective view of embodiment 100 of the rotatable handle of the present invention. This embodiment 100 comprises a D-shaped grip 105 for manipulating the handle, at least one hollow portion 110, and at least one connector housing 115. The connector housing 115 comprises a first-end opening 120, a middle portion 125, and a second-end opening 130. The hollow portion 110 is attached to the D-shaped grip 105. The interior of the hollow portion 110 partially houses at least one rotatable apparatus. The exterior wall of the hollow portion 110 engages with the first end opening 120 of the connector housing 115. To provide the user with a better grab while attaching the D-shaped grip to the connector housing, several grab tabs 140 are disposed on the exterior wall of the connector housing 115 around the first and second end openings 120 and 130. One end 135 of the shovel's shaft is disposed through the second end opening 130 and preferably attached to the rotatable apparatus disposed inside the connector housing 115 and the hollow portion 110. Preferably, the connector housing may rotate against the shaft in fifteen-degree increments. It is appreciated that the second-end opening 130 perimeter is made to fit the perimeter of the shovel's shaft, which is smaller than the inner perimeter of the middle portion 125 and the first-end opening 120. The inner perimeters of the middle portion 125 and the first-end opening 120 are made larger to receive the shaft, the connector, and the rotatable apparatus. The rotational handle 100 may comprise semi-permanent or permanent parts wherein the parts may be connected by means of screwing, pinning, or but not limited to, a locking mechanism that will maintain the structural integrity of the rotational handle 100. The handle further comprises a latch component that in turn comprises an S-shaped body 150 that is shaped to complement the contour of the side of the grip 105. The latch body 150 is attached to the side of the grip by a pin 155 at about the midsection of the latch body. The latch body can pivot on the pin 155 to lock and unlock the rotatable apparatus inside the hollow portion 110.

Figure 2:
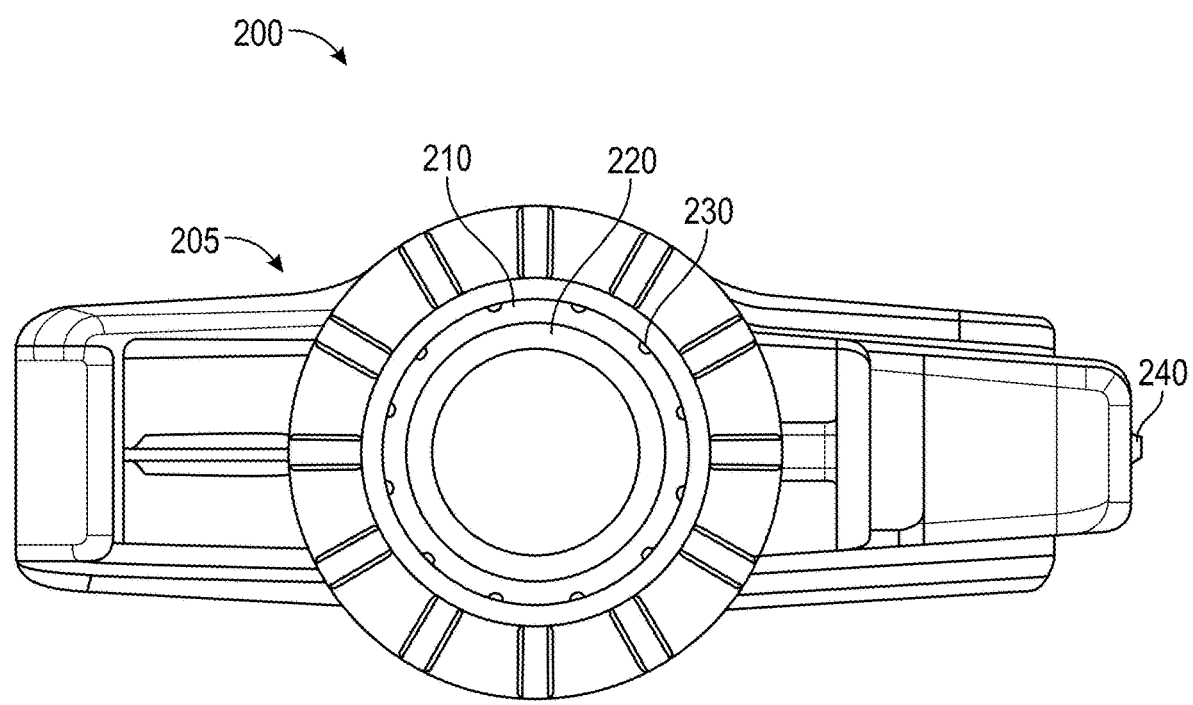
FIG. 2 depicts a bottom view of an embodiment of the current invention.

FIG. 2 illustrates a bottom view of embodiment 200 of the rotatable handle of the present invention. This embodiment comprises a rotatable apparatus 210 that receives a garden tool's shaft 220 and attaches to it by a variety of fastening means, as disclosed above. As this embodiment's body 205 and its grip, invisible in this view, rotate relative to the rotatable apparatus 210, they also rotate around the shaft 220. The rotatable apparatus in turn comprises cavities spaced around its outer wall to receive the pin 240. This pin prevents the embodiment's body 205 from rotating around the rotatable apparatus 210, and, thus, the shaft 220, once it is disposed in a cavity 230.

Figure 3:
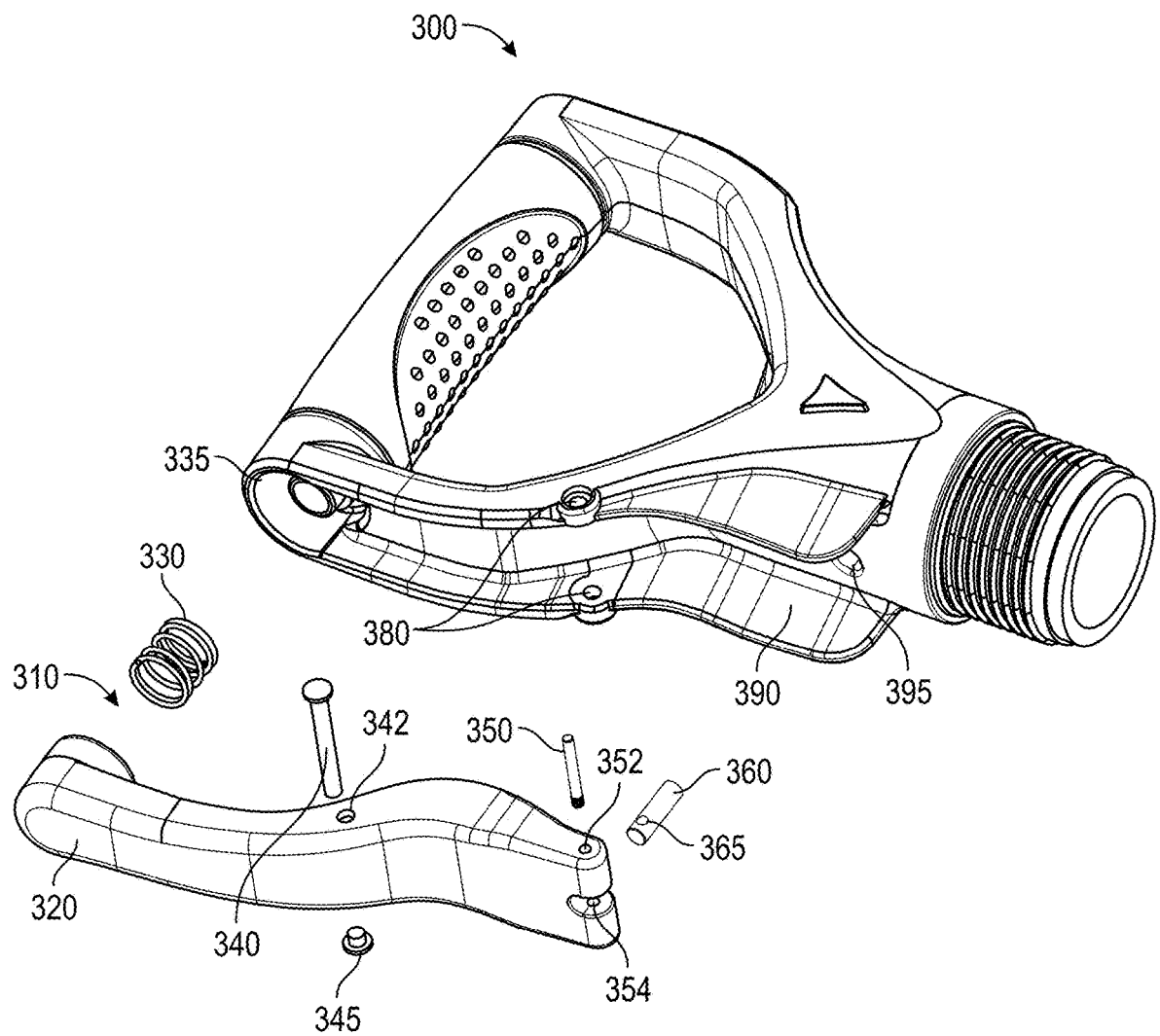
FIG. 3 depicts an exploded view of an embodiment of the current invention that shows the rotation lock component of the gardening tool handle.

FIG. 3 is an exploded view of embodiment 300 of the present invention. This embodiment comprises a latch component 310 that in turn comprises an elongated body 320 that has a S shape. When assembled, this latch component is disposed in a cavity 390, which also has an S shape, on a side of the handle. The latch component 310 further comprises a coil spring 330 that is disposed in between one end of the body 320 and a seat 335 in the cavity 390. The latch component further comprises a hinge pin 340 that has an end cap. When assembled, the pin 340 is disposed through and in a hinge 380 on the handle, through and in a hole 342 about the middle of the body 320, and is held in place by the end cap 345. It is contemplated that the pin 340 can be held in the hinge 380 by a variety of fastening methods besides the end cap 345. The latch component 310 further comprises a pin bolt 350 that is disposed through and in a hole 352 on and at one end of the body 320. When assembled, the bolt 350 screws into a threaded hole 354 on the one end of the body 320. Before screwing into the hole 354, the bolt passes through a hole 365 on an end of a pin 360. The bolt attaches the pin 360 to the body 320 but allows the pin to pivot on the axis of the bolt. When fully assembled, the body 320 is attached to the handle by the hinge pin 340, but it can pivot on the hinge. Since the body 320 is attached to the handle, the coil spring 330 only pushes the one end of the body 320 away from the handle and makes the body pivot on the hinge 380, and, thus, pushes the other end of the body 320 and the pin 360 toward the handle. The pin 360 is disposed through and in a hole 395 on the handle. The pin then engages with the rotatable apparatus disposed inside the hollow portion of the handle as disclosed hereinbefore.

To rotate the handle, the user applies force on the near end of the body 320 against the coil spring outward force and presses the near end toward the handle. The body 320 pivots on the hinge 380 and causes the far end of the body 320 and, thus, the pin 360 to move away from the handle. The pin 360 disengages with the rotatable apparatus inside the handle, so the rotatable apparatus is then free to rotate on the handle's and shaft's axis.

Figure 4:
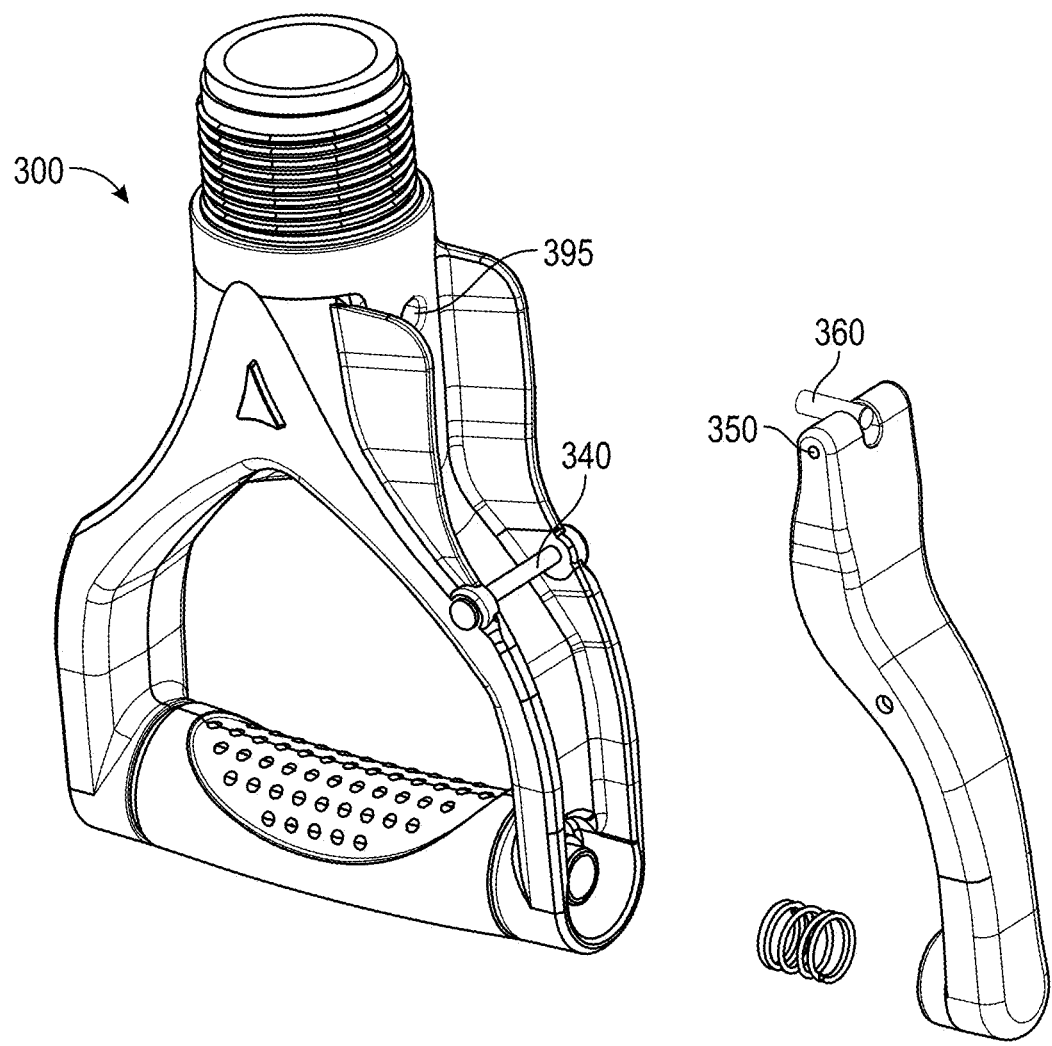
FIG. 4 depicts an exploded view of another embodiment of the current invention that shows a variation of the rotation lock component of the gardening tool handle.

FIG. 4 is another exploded view of the embodiment 300 of the present invention. In this view, the hinge pin 340 is assembled in the hinge 380 without the body 320 attached and blocking the detailed view of the assembled hinge pin. Also in this view, the pin 360 is attached to the body 320 by the bolt 350. As attached and the body 320 is attached, the pin 360 is inserted in the hole 395 so that it can engage with the rotatable apparatus.

Figure 5:
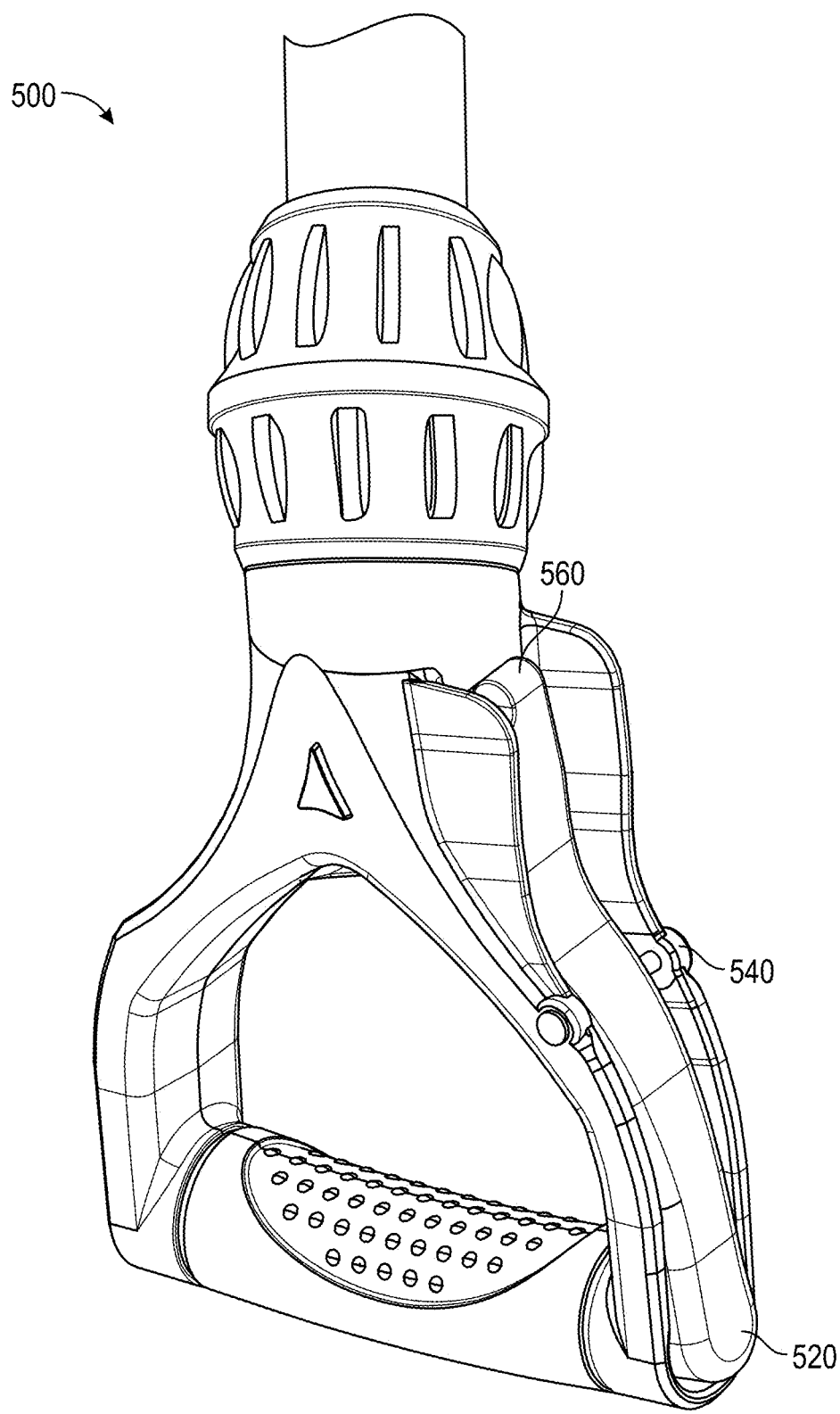
FIG. 5 depicts another perspective view of another embodiment of the current invention.

FIG. 5 is a perspective view of embodiment 500 of the present invention where the rotatable handle and the latch component are fully assembled. The latch component's end 520 is pushed away from the handle by a coil spring, as disclosed hereinbefore. The latch component is attached to the handle by the hinge 540. The other end 560 of the latch component is pressed by the pivot force firmly against the outer wall of the handle. As disclosed hereinbefore, a pin is attached to the end 560 and inserted into a hole on the handle so that it can engage with the rotatable apparatus disposed inside the hollow portion of the handle. When the user wants to rotate the handle on the shaft's axis, he applies force on the end 520 and presses it toward the handle, and, by the pivot force, the other end 560 is moved away from the handle, and the attached pin. This attached pin disengages from the internal rotatable apparatus. Thus, the rotatable apparatus is free to rotate.

What is claimed is:

1. A garden tool apparatus comprising:
   a rod having a first end and a second end;
   a tool head connected to said second end of said rod;
   a rotatable handle apparatus connected to said first end of said rod;
   wherein said rotatable handle apparatus comprises:
   a) a hand gripping apparatus comprising a shaft extending between two arms of a yoke and a lower cylindrical body having a hollow portion and an outer perimeter wherein said lower cylindrical body further comprises threads along said outer perimeter and a hole on a side thereof;
   b) a rotatable apparatus comprises a closed cylindrical body that in turn comprises a plurality of cavities radially disposed on an outer wall thereof;
   wherein said closed cylindrical body receives and attaches to said first end of said rod; wherein said rotatable apparatus is connected to said hollow portion; wherein said hollow portion is freely rotatable against said rotatable apparatus on a longitudinal axis of said rotatable apparatus and said rod;
   c) a cylindrical sleeve encircling said rotatable apparatus and said first end of said rod; wherein an inner parameter of at least a portion of said cylindrical sleeve is smaller than an outer parameter of said closed cylindrical body; wherein said cylindrical sleeve comprises internal threads; wherein said cylindrical sleeve secures said rotatable apparatus in said hollow portion by engaging said internal threads to said threaded outer perimeter of said hand gripping apparatus;
   d) a latch apparatus that comprises a S-shaped body that is attached to a side of said hand gripping apparatus at a midsection of said S-shaped body by a hinge pin and a hinge; wherein said latch apparatus further comprises a coil spring that is disposed in between a near end of said S-shaped body and said hand gripping apparatus; wherein said latch apparatus further comprises a pin bolt that is disposed at the far end of said S-shaped body; wherein said pin bolt attaches an impediment pin to said far end; wherein said impediment pin is disposed through said hole of said lower cylindrical body and selectively engageable with said plurality of cavities of said rotatable apparatus.

2. The garden tool apparatus of claim 1, wherein said impediment pin is pivotable on an axis of said pin bolt.

3. A garden tool apparatus comprising:
   a rod having a first end and a second end;
   a tool head connected to said second end of said rod;
   a rotatable handle apparatus connected to said first end of said rod;
   wherein said rotatable handle apparatus comprises:
   a) a hand gripping apparatus that in turn comprises a lower cylindrical body having a hollow portion that further comprises threads and a hole on a side thereof;
   b) a rotatable apparatus comprises a closed cylindrical body that in turn comprises a plurality of cavities radially disposed on an outer wall thereof;
   wherein said closed cylindrical body is connected to said first end of said rod; wherein said rotatable apparatus is connected to said hollow portion; wherein said hollow portion is freely rotatable against said rotatable apparatus on a longitudinal axis of said rotatable apparatus and said rod;
   c) a cylindrical sleeve enclosing said rotatable apparatus; wherein said cylindrical sleeve is connected to said hollow portion;
   d) a latch apparatus attached to a side of said hand gripping apparatus; wherein said latch apparatus comprises an impediment pin that is disposed through said hole of said lower cylindrical body and selectively engageable with said plurality of cavities of said rotatable apparatus.

* * * * *